United States Patent
Dietz et al.

(10) Patent No.: US 7,502,864 B2
(45) Date of Patent: Mar. 10, 2009

(54) OPTIMIZING THE TRANSMISSION AND STORAGE OF ELECTRONIC DOCUMENTS IN A COMMUNICATION NETWORK THROUGH THE SELECTIVE CONVERSION OF THE COLOR PALETTES OF DOCUMENT IMAGES TO PALETTES WITH A LOWER NUMBER OF COLORS

(75) Inventors: Timothy Alan Dietz, Austin, TX (US); Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1602 days.

(21) Appl. No.: 10/205,636

(22) Filed: Jul. 25, 2002

(65) Prior Publication Data

US 2004/0019692 A1    Jan. 29, 2004

(51) Int. Cl.
G06F 15/16 (2006.01)
(52) U.S. Cl. .................................................. 709/232
(58) Field of Classification Search ................ 709/246, 709/232; 715/749
See application file for complete search history.

(56) References Cited

U.S. PATENT DOCUMENTS

| | | | |
|---|---|---|---|
| 6,581,109 B1 * | 6/2003 | Fields et al. | 709/246 |
| 6,697,079 B2 * | 2/2004 | Rose | 345/593 |
| 6,925,606 B2 * | 8/2005 | Shaw et al. | 715/749 |
| 2002/0120781 A1 * | 8/2002 | Hirashima et al. | 709/246 |
| 2002/0169823 A1 * | 11/2002 | Coulombe et al. | 709/203 |

\* cited by examiner

Primary Examiner—Paul H. Kang
Assistant Examiner—Greg Bengzon
(74) Attorney, Agent, or Firm—Julius B. Kraft; Mark E. McBurney

(57) ABSTRACT

Enabling the server systems managing E-mail distribution, as well as the server systems managing Web site document distribution to selectively reduce the quality of images in E-mail and Web pages in order to maintain effective transmission and storage of such electronic documents. An implementation in the document transmission path intermediate the document sources and the receiving display stations determines the number of colors in the color palettes of images in transmitted documents, and a device responsive to the determination selectively converts these color palettes to color palettes having a lower number of colors for said images. Then, an implementation transmits the documents having these converted color palettes. There is also a storage device in the document transmission path intermediate the sources and the receiving display stations for storing the documents having the converted color palettes with a lower number of colors for the images.

31 Claims, 4 Drawing Sheets

OPTIMIZING THE TRANSMISSION AND STORAGE OF ELECTRONIC DOCUMENTS IN A COMMUNICATION NETWORK THROUGH THE SELECTIVE CONVERSION OF THE COLOR PALETTES OF DOCUMENT IMAGES TO PALETTES WITH A LOWER NUMBER OF COLORS

TECHNICAL FIELD

The present invention relates to computer managed communication networks, such as the World Wide Web (Web), and particularly to optimizing transmission of electronic documents, such as E-mail or Web pages containing images over such networks.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of Web documents or pages over these networks.

Also, as a result of the rapid expansion of the Web, E-mail, which has been distributed for over 25 years over smaller private and specific purpose networks, has moved into distribution over the Web because of the vast distribution channels that are available. The availability of extensive E-mail distribution channels has made it possible to keep all necessary parties in business, government and public organizations completely informed of all transactions that they need to know about at almost nominal costs. Because of the ease of such communication, the numbers of E-mail documents have greatly increased.

Web documents are provided from a Web distribution site usually made up of one or more server computers that access the document from resource databases in response to a user request sent over the Web through a Web browser on the user's receiving Web station. Significant Web distribution sites are made up of many coordinated server computers and associated databases. Such significant Web distribution sites usually serve large institutions, such as corporations, universities, retail stores or governmental agencies. These distribution sites may also provide to smaller businesses or organizations support for and distribution of individual Web pages created, owned and hosted by the individual small businesses and organizations.

Despite the substantial technological advancements made in recent years in the data transfer capacity (bandwidth) of communication networks, as well as the increasing capacity of storage systems, communication networks are having difficulty in keeping up with the rapidly increasing demand for more bandwidth and more storage capacity on the Web and associated private communication networks.

Because of the complexity of Web distribution sites, it is costly and time consuming to access Web documents through the complexity of servers and databases at the Web distribution sites. Accordingly, it has long been the practice at such sites to maintain distribution site caches that temporarily store recently accessed Web documents at a forward distribution point with respect to the Web, so as to avoid the cost and time of reaccessing such documents from the databases. Because of the increased Web usage, such cache storage facilities have been overburdened.

Similarly, there are great demands on E-mail distribution facilities. One of the more common current protocols for accessing and distributing E-mail involves POP (Post Office Protocol) servers. The service provider for the user receiving/sending display station provides a POP server that is characterized by relatively low amounts of storage capacity for the quantity of E-mail that it handles. Thus, it is not intended to store E-mail messages for long periods of time. The user's E-mail remains in the POP server until it is opened. Upon opening, the server downloads the E-mail to the user terminal. The POP server is discussed in more detail in the text, *The Web Navigator*, Paul Gilster, Wiley Computer Publishing, New York, 1997, at pp. 184-187.

Conventional Web distribution site server systems, as well as service providers maintaining the E-mail distribution servers, have little control of the complexity and extent of the images that the creators of E-mail or Web pages put into the documents. Such usages, of course, require much more data capacity and transmission bandwidth than does text. Consequently, electronic document distribution networks are seeking implementations that conserve the bandwidth and storage capacity requirements of electronic documents being transmitted over communication networks.

SUMMARY OF THE PRESENT INVENTION

Accordingly, the present invention enables the server systems managing E-mail distribution, as well as the server systems managing Web site document distribution, to selectively reduce the quality of images in E-mail and Web pages in order to maintain effective transmission and storage of such electronic documents. The invention involves the combination of means in the document transmission path, intermediate to the document sources and the receiving display stations, for determining the number of colors in the color palettes of images in transmitted documents, and means responsive to the determining means for selectively converting said color palettes to color palettes having a lower number of colors for said images. Then, means are provided for transmitting said documents having these images with converted color palettes. The invention also provides for means in the document transmission path intermediate to said sources and said receiving display stations for storing said documents having said converted color palettes with a lower number of colors for said images.

The means for selectively converting said color palettes to color palettes having a lower number of colors for said images, and the means for storing said documents having said converted color palettes with a lower number of colors for said images may be part of a network distribution service system associated with said document sources, e.g. a Web site administrator or an electronic mail distribution system associated with electronic mail sources.

Similarly, the means for selectively converting said color palettes to color palettes having a lower number of colors for said images, and the means for storing said documents having said converted color palettes with a lower number of colors for said images may be part of a communication network service provider connected to receiving display stations.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
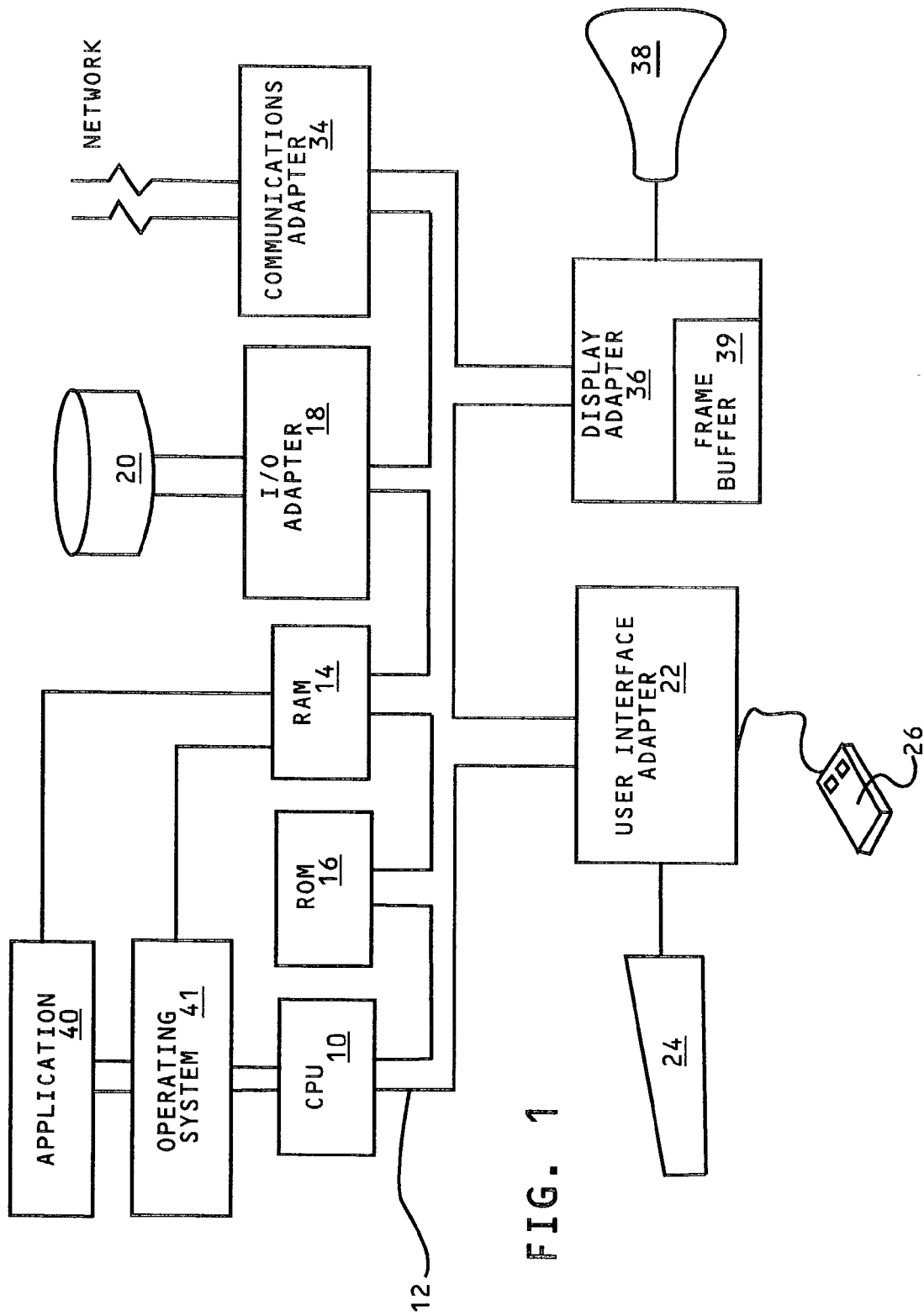
FIG. 1 is a block diagram of a data processing system including a central processing unit and network connections via a communications adapter that is capable of functioning as any of the server computers in the network distribution or resource site, the network service provider or as a user interactive display station for receiving Web pages or receiving/sending electronic mail.

Referring to FIG. 1, a typical data processing system is shown that may function as the computer controlled network receiving/sending display stations for electronic mail and Web document transmissions; the system shown is also illustrative of any of the server computers used for the Web E-mail and Web document distribution both at Web sites and at the sites of Web service providers for the receiving/sending display stations. These servers will be hereinafter described in greater detail with respect to FIG. 2.

A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX operating systems available from IBM; Microsoft's Windows XP™ or Windows2000™, as well as UNIX and LINUX operating systems. Application programs 40, controlled by the system, are moved into and out of the main memory Random Access Memory (RAM) 14. These programs include the programs of the present invention for enabling the selective reduction of the number of colors in the palettes used for specifying the colors for images in the electronic documents being transmitted. Where the computer system shown functions as the receiving network display station, then any conventional Web browser application program, such as the Microsoft's Internet Explorer™, will be available for accessing E-mail and Web pages from the Web and for sending E-mail to the Web from the network station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to electronic documents transmitted over networks, an understanding of networks and their operating principles would be helpful. We will not go into great detail in describing the networks to which the present invention is applicable. Reference has also been made to the applicability of the present invention to a global network such as the Internet or Web. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to the lower level objects in the hierarchy through a variety of network server computers. E-mail and Web pages are distributed through such a network.

Figure 2:
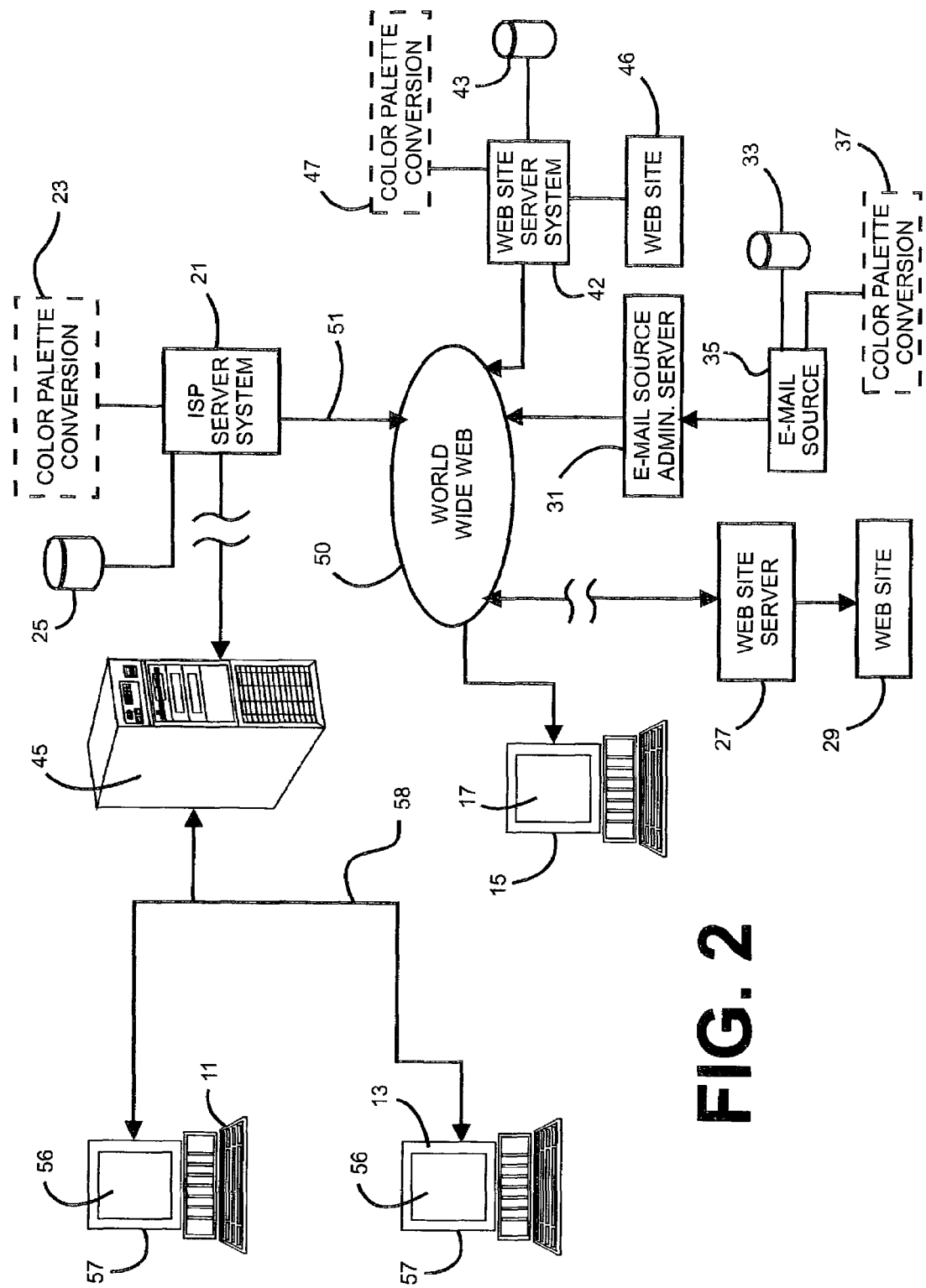
FIG. 2 is a generalized diagrammatic view of a Web portion that may be used in the practice of this invention.

A generalized diagram of a portion of the Web for illustration of the electronic document distribution system of the present invention is shown in FIG. 2. In an illustration where the documents are E-mail, the computer controlled display stations 11 and 13 have displays 57 upon which E-mail documents 56 may be created by senders and displayed. Terminals 11 and 15 may be implemented by the computer system set up in FIG. 1, and connection 58 (FIG. 2) is the network connection shown in FIG. 1. Reference may be made to the above-mentioned *Mastering the Internet*, pp. 136-147, for typical connections between local display stations to the Web via network servers, any of which may be used to implement the system on which this invention is used. In the typical set up shown, terminals are connected via, let us say, host dial connections (not shown) to server 45 provided by a Web Service Provider system 21 that in turn accesses the Web 50 via connection 51. For the purpose of this embodiment, E-mail is created on either terminal 11 or 13 and sent over the Web 50 to receiving terminals 15 where it may be displayed 17. The Web Service Provider system 21 that may be based upon the previously mentioned POP (Post Office Protocol) system manages the distribution of this E-mail, as well as the distribution of other electronic documents. Whether the Web Service Provider uses the POP system with its sparse storage capacity or other network distribution systems, storage capacity for the system present a definite problem. The server system 21 stores the in/out electronic documents of its clients at stations like 11 and 13 in storage facilities 25 of limited capacity. The present invention recognizes that electronic documents often needlessly incorporate color images with very high resolution coloring, i.e. images created by 32 bit color image palettes. While the users will, under certain circumstances, require the higher color images created through 32 bit palettes, e.g. in Web advertisements or product offerings, it is most frequently the case that the high color resolution images are created merely because the devices with which they were created had that capacity.

Dependent upon the storage and transmission capacities of the Web Service Provider system and the extent to which images are used in the transmitted documents, the data necessary to support images in electronic documents may have a significant effect on these operations. For example, the reduction of Bmp images from a 32 bit color palette (providing an almost infinite number of colors) to an 8 bit color palette (256 colors) would save 24 bits per pixel in the image. In a 800× 600 size image (480,000 pixels) image, this would come to a 1.44 MB savings in data that has to be stored or transmitted. Other image formats could be similarly reduced. In images that already have been subjected to some compression as in JPEG images, the reduction would not be as great but it would still be a significant saving. Actually, the 256 colors produced by the 8 bit color palette are 256 shades of the eight primary colors. On the other hand, the 32 bit color palettes provide true color or full color images that have 16.8 million possible shades. Note the human eye is believed to distinguish only about 10 million of these shades.

In an operation, the service provider management would be enabled whenever storage and data transmission capacities warranted to enter into a default condition wherein all images in the electronic documents would have their color palettes reduced unless the electronic document sender or receiver had specified that this reduction should not be applied. Suitable economic incentives could be applied to such users to support these default conditions.

In any event, the service provider system 21 has a standard program 23 for converting the color palettes of images in the electronic documents so as to reduce the number of color bits per pixel and, thus, the number of colors per pixel. The program makes use of conversion tables to convert each of the very great number of color shades available at 32 bits per pixel to the lesser number of colors available from 8 bits per pixel. For example, assume that in the full color palettes, there are 500,000 shades of green, while in the 8 bit (256 color) palettes, there are 20 shades of green. In such a case, a full color palette shade of green would be remapped in the table to one of the 20 shades of green closest to it. Color palette conversion tools are commercially available from LEAD Technologies Inc., among others.

The color number reduction palette conversion could be carried out at other points in the Web transfer of electronic documents. For example, Web pages from Web site 29 requested by display station 11 and accessed through Web site server 27 would be tracked by service provider system 21, and have the color palette numbers for images in the Web pages reduced by color palette conversion program 23 and then stored in storage facility 25 before such Web pages are transmitted to receiving station 11.

An E-mail source 35 on the Web could be set up so as to be tracked for image palette size by an E-mail source administrator or manager 31, and have the color palette numbers for images in the Web pages reduced by color palette conversion program 37 and stored in storage facility 25 before such E-mail is transmitted on to the Web sent to Web station 11. Similarly, a Web site 46, from which Web pages have been requested by receiving station 11, could be set up so as to be tracked for image palette size by Web site server system 42, and have the color palette numbers for images in the Web pages reduced by color palette conversion program 47 and stored in storage facility 43 before such Web pages are transmitted on to the Web sent to Web station 11. Also, the color palette tracking and conversion could be carried out the level of the server 45 for the browser caches for receiving stations 11 and 13 under appropriate circumstances.

Figure 3:
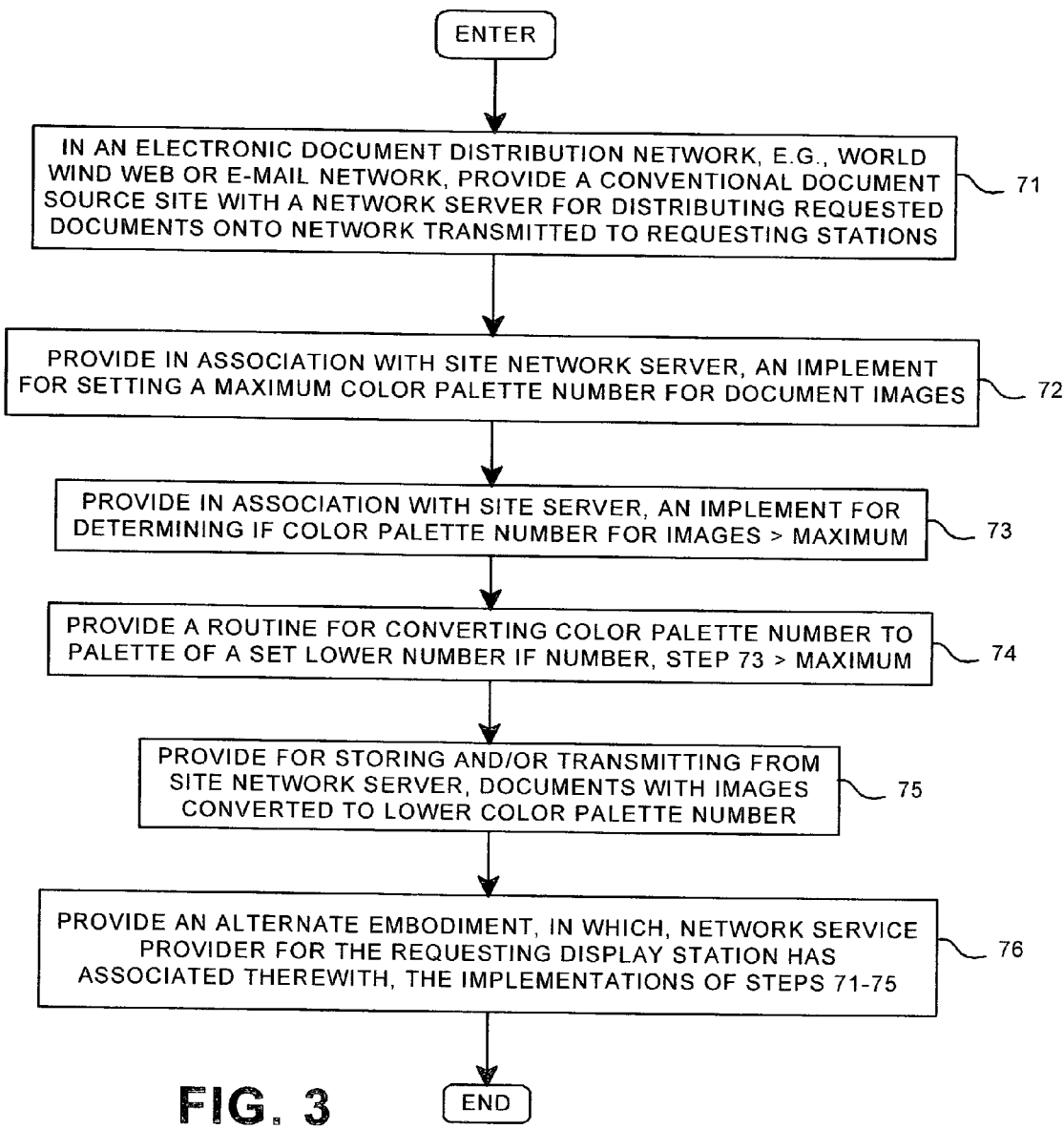
FIG. 3 is an illustrative flowchart describing the setting up of the functions of enabling the selective conversion of electronic document images to images having lower numbers of colors in the image color palette.

FIG. 3 is a flowchart showing the development of a process according to the present invention for enabling the selective conversion of color palettes in electronic document images to lower the number of colors in color palettes forming the images. In an electronic document distribution network, such as the Web, there is provided a conventional document source site with a network server for distributing on to the Web, documents requested by Web stations, step 71. There is provided, in association with one or more network site servers, an implementation for setting a maximum color palette number, e.g. 8 bit/256 colors for electronic document images, step 72. There is also provided in association with the network site servers, step 73, an implementation for determining whether the color palette number for the document images are greater than the maximum set in step 72. Then, there is provided a routine for converting the color palettes of images having numbers greater than the maximum as determined in step 73 to a set lower color number palette, step 74. Then, provision is made for storing and/or transmitting from the site network server, documents with color palettes converted to the lower palette number, step 75. An alternate embodiment may be provided, step 76, wherein the network service provider for a requesting display station has associated therewith all of the implementations described with respect steps 71 through 75.

Figure 4:
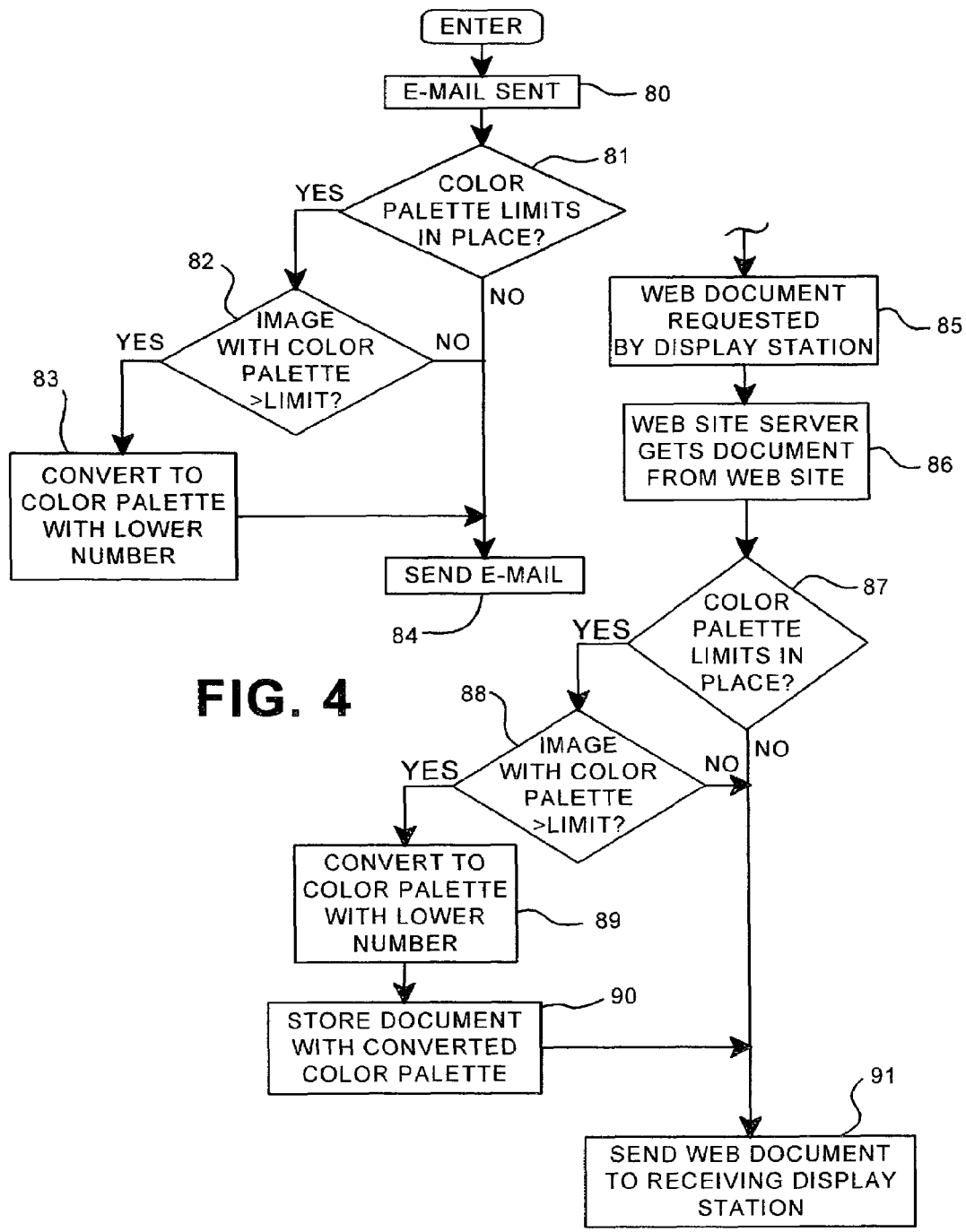
FIG. 4 is a flowchart of an illustrative run of the program set up according to FIG. 3.

A couple of simplified runs of the process set up in FIG. 3 will now be described with respect to FIG. 4. First, with respect to an E-mail sent from a display station, when the user presses the send button, step 80, a determination is made at the service provider as to whether there have been limits set as to the size of color palette for images, step 81. If Yes, then a further determination is made, step 82, as to whether the E-mail has an image with a color palette exceeding the limits. If Yes, a color palette conversion is made from such images to palettes having a lower number of colors, step 83. Then, or if the decision for either step 81 or 82 is No, the E-mail is sent to its destination.

In a variation related to requested Web pages, a Web page is requested by a Web station, step 85. An appropriate server at the Web site or Web page source gets the document, step 86, and a determination is made at Web site server as to whether there have been limits set as to the size of color palette for images, step 87. If Yes, then a further determination is made, step 88, as to whether the Web page has an image with a color palette exceeding the limits. If Yes, a color palette conversion is made from such images to palettes having a lower number of colors, step 89. The Web page with the converted color palette is stored in association with the Web site server. Then, or if the decision for either step 87 or 88 is No, the Web page is sent to the requesting display station.

One of the preferred implementations of the present invention is in application program 40 made up of programming steps or instructions resident in RAM 14, FIG. 1, of Web server computers during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a communication network with user access via a plurality of data processor controlled interactive receiving display stations for displaying hypertext documents transmitted to the receiving display stations from document sources remote from said stations, an electronic document distribution system comprising:

means in the document transmission path intermediate said sources and said receiving display stations for determining the number of colors in the color palettes of images in transmitted documents;

means responsive to said determining means for selectively converting said color palettes to color palettes having a lower number of colors for said images; and means for transmitting said documents having said converted color palettes with a lower number of colors for said images.

2. The communication network of claim 1 further including means in the document transmission path intermediate said sources and said receiving display stations for storing said documents having said converted color palettes with a lower number of colors for said images.

3. The communication network of claim 2 further comprising a network distribution service system associated with said document sources including:

said means for selectively converting said color palettes to color palettes having a lower number of colors for said images; and said means for storing said documents having said converted color palettes with a lower number of colors for said images.

4. The communication network of claim 3 wherein said network distribution service system is an electronic mail distribution system associated with electronic mail sources.

5. The communication network of claim 3 wherein:
   said communication network is the World Wide Web;
   said hypertext documents are Web pages;
   said document sources are Web sites; and
   said network distribution service system is a Web site server system.

6. The communication network of claim 2 further comprising a communication network service provider connected to said receiving display stations, said service provider including:

said means for selectively converting said color palettes to color palettes having a lower number of colors for said images;

said means for storing said documents having said converted color palettes with a lower number of colors for said images; and said means for transmitting said documents having said converted color palettes with a lower number of colors for said images to said receiving display stations.

7. The communication network of claim 6 wherein said documents are electronic mail and said service provider accesses said electronic mail from said network.

8. The communication network of claim 6 wherein:
   said communication network is the World Wide Web;
   said hypertext documents are Web pages; and
   said network service provider is a Web service provider.

9. In a communication network with user access via a plurality of data processor controlled interactive receiving display stations for displaying hypertext documents transmitted to the receiving display stations from document sources remote from said stations, a method of distributing transmitted electronic documents comprising:

determining the number of colors in the color palettes of images in electronic documents being transmitted between document sources and receiving display stations;

selectively converting said color palettes to color palettes having a lower number of colors for said images in response to said determination; and continuing to transmit said documents having said converted color palettes with a lower number of colors for said images.

10. The method of distributing electronic documents of claim 9 further including the step of storing the transmitted documents having said converted color palettes with a lower number of colors for said images.

11. The method of distributing electronic documents of claim 10 wherein said steps of selectively converting said color palettes to color palettes having a lower number of colors, and storing the transmitted documents having said converted color palettes are carried out in association with said document sources.

12. The method of distributing electronic documents of claim 11 wherein said electronic documents are electronic mail, and said document sources are electronic mail sources.

13. The method of distributing electronic documents of claim 11 wherein:
   said communication network is the World Wide Web;
   said hypertext documents are Web pages; and
   said document sources are Web sites.

14. The method of distributing electronic documents of claim 13 wherein said steps of:

determining the number of colors in the color palettes of images in said electronic documents being transmitted;

selectively converting said color palettes to color palettes having a lower number of colors; and storing the transmitted documents having said converted color palettes are carried out by a Web service provider serving the receiving display station.

15. The method of distributing electronic documents of claim 12 wherein said steps of:

determining the number of colors in the color palettes of images in said electronic documents being transmitted;

selectively converting said color palettes to color palettes having a lower number of colors; and storing the transmitted documents having said converted color palettes are carried out by an electronic mail service provider serving the receiving display station.

16. A computer program having code recorded on a computer readable medium for distributing electronic documents in a communication network with user access via a plurality of data processor controlled interactive receiving display stations for displaying hypertext documents transmitted to the receiving display stations from document sources remote from said stations, said program comprising:

means in the document transmission path intermediate said sources and said receiving display stations for determining the number of colors in the color palettes of images in transmitted documents;

means responsive to said determining means for selectively converting said color palettes to color palettes having a lower number of colors for said images; and means for transmitting said documents having said converted color palettes with a lower number of colors for said images.

17. The computer program of claim 16 further including means in the document transmission path intermediate said sources and said receiving display stations for storing said documents having said converted color palettes with a lower number of colors for said images.

18. The computer program of claim 17 further comprising a network distribution service system associated with said document sources including:

said means for selectively converting said color palettes to color palettes having a lower number of colors for said images; and said means for storing said documents having said converted color palettes with a lower number of colors for said images.

19. The computer program of claim 18 wherein said network distribution service system is an electronic mail distribution system associated with electronic mail sources.

20. The computer program of claim 19 wherein:

said communication network is the World Wide Web;
said hypertext documents are Web pages;
said document sources are Web sites; and
said network distribution service system is a Web site server system.

21. The computer program of claim 17 further comprising a communication network service provider connected to said receiving display stations, said service provider including:

said means for selectively converting said color palettes to color palettes having a lower number of colors for said images;

said means for storing said documents having said converted color palettes with a lower number of colors for said images; and said means for transmitting said documents having said converted color palettes with a lower number of colors for said images to said receiving display stations.

22. The computer program of claim 21 wherein said documents are electronic mail and said service provider accesses said electronic mail from said network.

23. The computer program of claim 21 wherein:

said communication network is the World Wide Web;
said hypertext documents are Web pages; and
said network service provider is a Web service provider.

24. In a communication network with user access via a plurality of data processor controlled interactive receiving display stations for displaying hypertext documents transmitted to the receiving display stations from document sources remote from said stations, apparatus in the document transmission path intermediate said sources and said receiving display stations comprising:

a device for determining the number of colors in the color palettes of images in transmitted documents;

an implementation responsive to said determining device for selectively converting said color palettes to color palettes having a lower number of colors for said images; and an implementation for transmitting said documents having said converted color palettes with a lower number of colors for said images.

25. The communication network of claim 24 further including a storage device in the document transmission path intermediate said sources and said receiving display stations for storing said documents having said converted color palettes with a lower number of colors for said images.

26. The communication network of claim 25 further comprising a network distribution service system associated with said document sources including:

said implementation for selectively converting said color palettes to color palettes having a lower number of colors for said images; and said device for storing said documents having said converted color palettes with a lower number of colors for said images.

27. The communication network of claim 26 wherein said network distribution service system is an electronic mail distribution system associated with electronic mail sources.

28. The communication network of claim 26 wherein:

said communication network is the World Wide Web;
said hypertext documents are Web pages;
said document sources are Web sites; and
said network distribution service system is a Web site server system.

29. The communication network of claim 25 further comprising a communication network service provider connected to said receiving display stations, said service provider including:

said implementation for selectively converting said color palettes to color palettes having a lower number of colors for said images;

said device for storing said documents having said converted color palettes with a lower number of colors for said images; and said implementation for transmitting said documents having said converted color palettes with a lower number of colors for said images to said receiving display stations.

30. The communication network of claim 29 wherein said documents are electronic mail and said service provider accesses said electronic mail from said network.

31. The communication network of claim 29 wherein:

said communication network is the World Wide Web;
said hypertext documents are Web pages; and
said network service provider is a Web service provider.

* * * * *